United States Patent [19]

Pfeffer et al.

[11] Patent Number: 4,966,762

[45] Date of Patent: Oct. 30, 1990

[54] PROCESS FOR MANUFACTURING A SODA ASH PEROXYGEN CARRIER

[75] Inventors: Henry A. Pfeffer, Mercerville; William A. Hills, Lawrenceville, both of N.J.

[73] Assignee: FMC Corporation, Philadelphia, Pa.

[21] Appl. No.: 254,063

[22] Filed: Oct. 6, 1988

[51] Int. Cl.[5] .................................... C01B 15/10
[52] U.S. Cl. .......................... 423/415 P; 423/272; 252/186.27
[58] Field of Search ............... 423/415 P, 272; 252/186.27, 186.28, 186.29

[56] References Cited

U.S. PATENT DOCUMENTS

| | | | |
|---|---|---|---|
| 122,277 | 8/1844 | Slater et al. | |
| 1,225,722 | 5/1917 | Schaidhauf | 423/415 P |
| 1,225,832 | 5/1917 | Liebknecht | 423/415 P |
| 1,669,997 | 5/1928 | Noll | 423/415 P |
| 1,950,320 | 3/1934 | Muller | 423/415 P |
| 2,167,997 | 8/1939 | Reichert | 23/62 |
| 2,254,434 | 9/1941 | Lind et al. | 252/95 |
| 2,380,620 | 7/1945 | Walters | 23/62 |
| 2,541,733 | 2/1951 | Young | 23/63 |
| 3,122,417 | 2/1964 | Blaser et al. | 23/207.5 |
| 3,387,939 | 6/1968 | Reilly et al. | 23/207.5 |
| 3,463,618 | 8/1969 | Harris et al. | 23/315 |
| 3,677,697 | 7/1972 | Yanush | 23/62 |
| 3,773,678 | 11/1973 | Munday | 252/186 |
| 3,801,706 | 4/1974 | Sack | 423/421 |
| 3,860,694 | 1/1975 | Jayawant | 423/415 P |
| 3,864,454 | 2/1975 | Pistor et al. | 423/415 P |
| 3,951,838 | 4/1976 | Jayawant et al. | 252/99 |
| 3,960,888 | 6/1976 | Ploser et al. | 423/415 P |
| 3,977,988 | 8/1976 | Tokiwa et al. | 252/99 |
| 3,979,318 | 9/1976 | Tokiwa et al. | 252/186 |
| 3,984,342 | 10/1976 | Hall et al. | 252/186 |
| 4,018,874 | 4/1977 | Mollard | 423/415 P |
| 4,020,148 | 4/1977 | Mohr et al. | 423/415 P |
| 4,025,609 | 5/1977 | Matsunaga | 423/415 P |
| 4,075,116 | 2/1978 | Mesaros | 252/102 |
| 4,118,465 | 10/1978 | Malafosse | 423/415 P |
| 4,131,562 | 12/1978 | Lutz et al. | 423/415 P |
| 4,146,571 | 3/1979 | Will et al. | 423/415 P |
| 4,171,280 | 10/1979 | Maddox et al. | 423/415 P |
| 4,279,769 | 6/1981 | Yagi et al. | 423/415 P |
| 4,388,287 | 6/1983 | Sugano et al. | 423/415 P |
| 4,409,197 | 10/1983 | Sugano et al. | 423/415 P |
| 4,526,698 | 7/1985 | Kuroda et al. | 252/99 |

FOREIGN PATENT DOCUMENTS

| | | | |
|---|---|---|---|
| 070711 | 1/1983 | European Pat. Off. | 423/415 P |
| 132570 | 10/1978 | German Democratic Rep. | 423/415 P |
| 140140 | 2/1980 | German Democratic Rep. | 423/415 P |
| 212947 | 8/1984 | German Democratic Rep. | 423/415 P |
| 213417 | 9/1984 | German Democratic Rep. | 423/415 P |
| 47-36636 | 9/1972 | Japan | 423/415 P |
| 60-11210 | 5/1985 | Japan | 423/415 P |

Primary Examiner—Gary P. Straub
Attorney, Agent, or Firm—R. E. Elden; R. L. Anderson

[57] ABSTRACT

A novel process is claimed for manufacturing a composition of matter comprising particles which appear to comprise sodium carbonate, sodium carbonate peroxide and a stabilizer such as, a disphosphonic acid, the anhydrous sodium carbonate being present in sufficient quantity to form sodium carbonate monohydrate by reacting with all of the water formed on decomposition of the sodium percarbonate.

2 Claims, 3 Drawing Sheets

SAPC

PROCESS FOR MANUFACTURING A SODA ASH PEROXYGEN CARRIER

The present invention is a process for manufacturing a solid composition of soda ash and hydrogen peroxide which has good storage stability and is useful to provide an alkaline peroxide solution when dissolved in water.

Sodium carbonate, also known as soda ash, is known to form at least two solid addition compounds with hydrogen peroxide, $2Na_2CO_3.3H_2O_2$ (sodium carbonate sesquiperoxide) and $2Na_2CO_3.3H_2O_2.2H_2O$ (sodium carbonate sesquiperoxide hydrate). Sodium carbonate sesquiperoxide commonly is known as sodium percarbonate and is also called sodium carbonate peroxide or sodium carbonate perhydrate and is abbreviated herein as "SCP". SCP has been the subject of much study because of its many potential applications as a peroxygen source when dissolved in an aqueous solution. Although it has the advantages of a high active oxygen content (over 15%), high solubility in water, relatively cheap raw materials and very low adverse environmental impact, SCP has never achieved the commercial acceptance of sodium perborate.

However, SCP exhibits a drawback because it is much less stable than the perborate. Solid SCP undergoes decomposition, with a loss of active oxygen substantially greater than the decomposition of perborate under the same conditions. This problem is particularly undesirable in cartons of detergents sold at retail, during detergent processing or during storage following delivery to a detergent manufacturer. The elimination of impurities, such as heavy metals which catalyze the decomposition reaction, alleviates the problem caused by instability of aqueous SCP solutions.

Numerous solutions have been proposed for alleviating this stability problem of solid SCP, but to date none have been entirely successful.

U.S. Pat. No. 2,380,620 discloses that sodium silicate, magnesium sulphate or gum arabic are unsatisfactory stabilizers when incorporated into the reaction mixture. The patent teaches that adding diphenylguanidine would lessen the decomposition, preferably in the presence of the conventional stabilizers.

U.S. Pat. No. 2,541,733 teaches a process for incorporating magnesium carbonate and a silicate into the SCP crystals as the crystals are formed in the mother liquor. U.S. Pat. No. 3,677,697 teaches adding a silicate and benzoic acid to the crystals prior to drying.

U.S. Pat. No. 3,951,838 discloses that prior attempts at chemical stabilization, primarily by magnesium silicate, are generally ineffective in promoting long term stability of SCP, particularly in a humid atmosphere. The patent instead teaches coating the particles with an aqueous silica sol and drying.

U.S. Pat. No. 3,977,988 to Fumikatsu et al. discloses coating SCP with paraffin, polyethylene glycol or sodium pyrophosphate to be impractical and suggests coating the particles with a film of a silicate and a silicofluoride. In U.S. Pat. No. 3,979,318 the same inventors teach coating SCP particles with a hydrophobic liquid.

U.S. Pat. No. 4,075,116 teaches cocrystallizing SCP with other salts known to form perhydrates such as sodium sulfate, sodium pyrophosphate, sodium glucoheptonate, sodium perborate and others.

U.S. Pat. No. 4,409,197 teaches incorporating an N,N,N',N'-tetra(phosphonomethyl)diaminoalkane into the reaction solution prior to crystallizing SCP.

U.S. Pat. Nos. 4,171,280 and 4,260,508 teach a non-caking bleach composition may be formed containing up to 6% active oxygen as SCP by spraying only sufficient hydrogen peroxide onto sodium carbonate particles to partially convert the sodium carbonate or sodium carbonate monohydrate to SCP. U.S. Pat. No. 4,260,508 teaches adding a sodium phosphate to the composition as a stabilizer. Both patents teach against producing a product containing more than 6% active oxygen and that an assay of less than 6% active oxygen (less than 40% SCP) is necessary to obtain satisfactory stability. The low assay also is critical to prevent caking and demixing or separating in formulations. However, the low assay is a great disadvantage because of the added shipping costs, the cost of the added inert raw materials and the increased capital cost because of the larger size equipment necessary to obtain desired throughput. Even more objectionable is that the low assay restricts the end use formulator to compositions containing less than 6% active oxygen.

The present invention overcomes the shortcomings of the prior art by providing a process for manufacturing a stabilized soda ash peroxygen carrier composition comprising:

process for manufacturing a soda ash peroxygen carrier composition comprising incorporating into an aqueous solution of 50% to 80% by weight hydrogen peroxide a diphosphonic acid or salt having a formula of

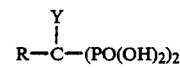

wherein Y is hydrogen or hydroxyl, R is hydrogen or an aliphatic hydrocarbon group having one to six carbons, to form a mixed solution, uniformly applying the mixed solution to a solid particulate reaction mixture initially comprising substantially anhydrous particles of sodium carbonate, concomitantly urging water vapor from the surface of the reaction mixture, maintaining the temperature of the reaction mixture between about 35° C. and 80° C., the diphosphonic acid or salt being present in an effective amount to provide between 1 and 5 moles of sodium carbonate in the composition for each mole of available water in the composition.

It is critical to provide sufficient sodium carbonate in the composition to be able to combine with all of the available water in the composition to form sodium carbonate monohydrate; the term "available water" includes water chemically available as hydrogen peroxide, water of crystallization of sodium carbonate hydrates and free water which may temporarily exist in the composition.

As used herein, the term "particulate solid" ideally refers to particles all of which comprise sodium carbonate, SCP and stabilizer and excludes a physical mixture of separate particles of sodium carbonate and of SCP. However, such an ideal is not practical, particularly in compositions containing 5 moles of sodium carbonate per mole of available water. Desirably, a major proportion of the particles comprise sodium carbonate, SCP and stabilizers, preferably 90% of the particles comprise sodium carbonate, SCP and stabilizer.

The concentration of hydrogen peroxide can be varied over a wide range. If the concentration of the hydrogen peroxide is substantially below 50% by weight too much water must be removed as a vapor in the gas stream. On the other hand, if the hydrogen peroxide is too concentrated an excessive decomposition may take place because of the heat of reaction, raising the cost unnecessarily. Desirably, the concentration of hydrogen peroxide will be nominally 70%, that is between 65% and 75% by weight.

It is within the ambit of this invention that hydrogen peroxide initially more dilute than 50% could be employed in the mixed solution by evaporating part of the water therefrom prior to applying the mixed solution to the reaction mixture.

The mixed solution is desirably applied to the solid reaction mixture by spraying liquid droplets onto the particulate reaction mixture at a rate sufficient to prevent wetting the particles sufficiently to cause agglomeration or caking. Alternatively, the particulate reaction mixture may be flowed over a porous surface containing mixed solution within the pores, thereby transferring mixed solution onto a surface of the particles. Preferably, the particulate reaction mixture may be retained in a cylinder or solids blender and tumbled while concomitantly spraying mixed solution onto the tumbling reaction mixture.

Water vapor may be urged from the surface of the reaction mixture by reducing the pressure to less than the equilibrium water vapor pressure, or more simply, by urging an inert, unsaturated gas stream over the surface of the reaction mixture or through the reaction mixture at a rate sufficient to remove sufficient water vapor to prevent condensation or substantial absorption.

Desirably, the assay of the composition will be between 45% and 75% as SCP (between 14.6% and 24% as hydrogen peroxide or 7% and 11.4% active oxygen). Preferably the assay of the composition will be between 65% and 75% as SCP) between 21% and 24% $H_2O_2$ or 9% and 10.6% active oxygen). Unless indicated otherwise, all percentages used herein are rounded off to the nearest whole number or significant figure.

Unexpectedly it was found that the compositions were stable without the need for the coatings required by the prior art. It was further unexpectedly found that the compositions did not cake on storage in humid atmospheres even though the assay of the compositions was 45% to 75% SCP, even when the vapor pressure of water was substantially greater than the equilibrium vapor pressure of sodium carbonate monohydrate.

Further, it was found that the compositions were particularly useful as a solid and storage stable source of peroxygen when formulated into detergent compositions. The compositions assaying between 45% and 75% as SCP were found to be particularly useful and stable compounds in detergent formulations.

BRIEF DESCRIPTION OF THE FIGURES

FIG. 1 is the thermogravimetric analyses (TGA) curves of a SAPC composition initially containing two types of water of hydration.

FIG. 2 is the differential thermal analysis (DTA) curve of anhydrous SAPC composition.

FIG. 3 is the TGA curves of the anhydrous SAPC of FIG. 2. These three figures are discussed in detail in example 3.

Figure 1:
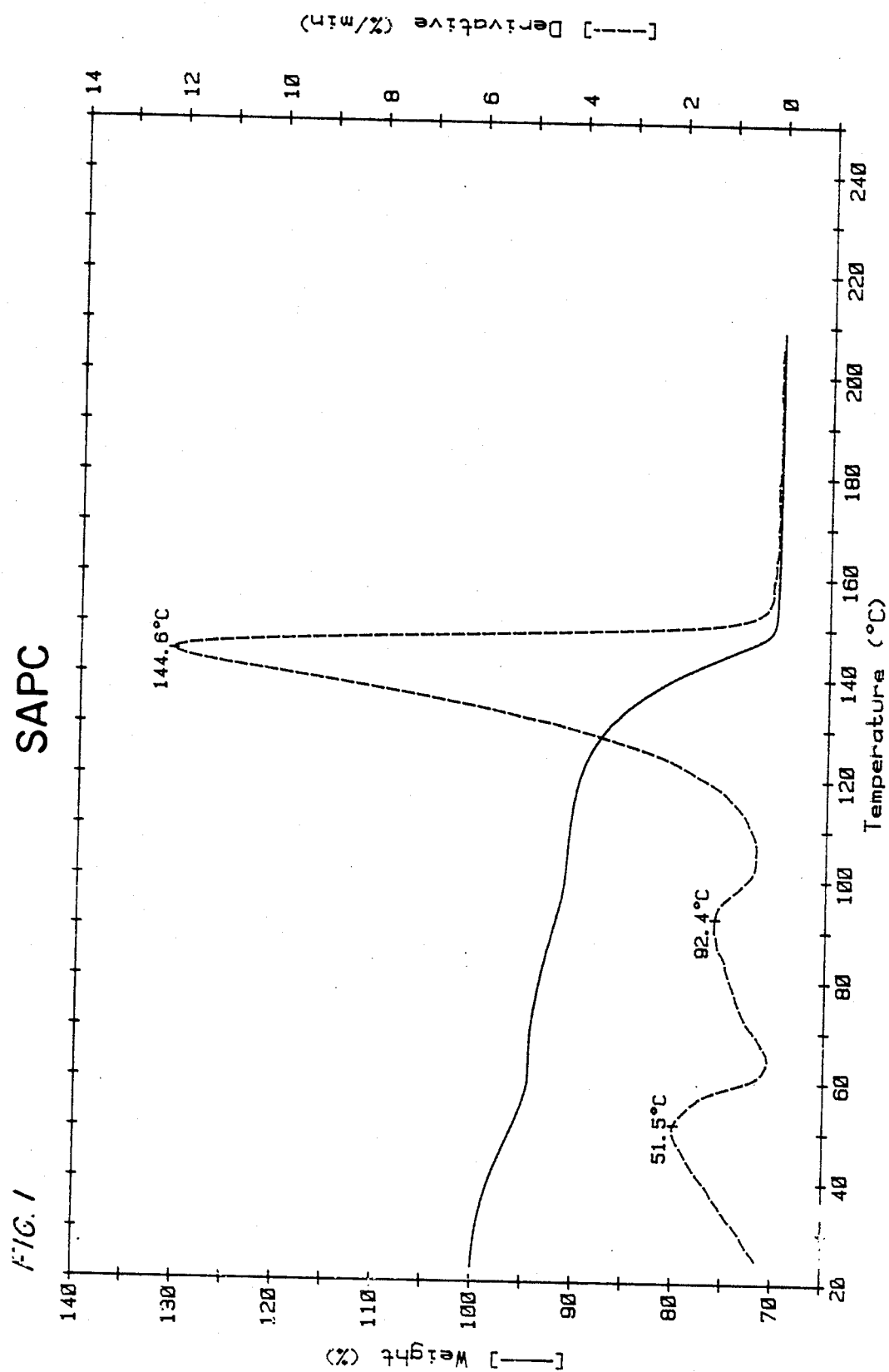
FIGS. 1, 2, and 3 are curves showing the thermal stability of the SAPC composition.

The incorporation of a "stabilizer" for the composition is critical to the invention. The stabilizer appears to do more than prevent decomposition of the composition; the stabilizer appears to change the physical properties of the composition as measured by the equilibrium vapor pressure of sodium carbonate monohydrate, as well as the active oxygen stability on storage. Clearly what "appears to be" sodium carbonate monohydrate and anhydrous sodium carbonate by the standard assays employed is an oversimplification. For the purpose of this invention we will describe the novel compositions as if they consisted of a simple mixture of SCP, anhydrous sodium carbonate, sodium carbonate monohydrate, sodium carbonate decahydrate and a stabilizer. For clarity the novel composition is called a "Soda Ash Peroxygen Carrier", or simply SAPC. Because of this inability to precisely define the composition the product made by the inventive process is also claimed as part of the scope of the invention.

A particularly desirable diphosphonic acid is a 1-hydroxyalkyl-1,1-diphosphonic acid which is commercially available. A typical example is sold under the tradename Dequest 2010, 1-hydroxyethylene-1,1-diphosphonic acid by Monsanto Chemical Co. in St. Louis, Mo. Surprisingly, it was found that the diphosphonic acid or salt appears to modify the sodium carbonate monohydrate crystal permitting its dehydration under very mild conditions compared with the published data. On the other hand, the excess of anhydrous sodium carbonate still appears to be able to remove water from sodium carbonate decahydrate by forming sodium carbonate monohydrate.

The temperature of the reaction mixture, the flow of inert gas stream over the reaction mixture and the removal of excess water are all interdependent with the concentration of hydrogen peroxide in the reaction mixture and the stabilizer. For example, U.S. Pat. No. 4,171,280 teaches that it is impossible to produce a SCP composition by the claimed process containing over 6% available oxygen (an assay of about 40% SCP). However, the present Process permits producing a stable SAPC assaying up to 75% SCP by carefully controlling the heat and material balances. The temperature of the reaction mixture must be maintained above the point at which sodium carbonate decahydrate forms (about 35° C.). On the other hand, the temperature of the reaction mixture should be below 80° C. to avoid excess peroxide decomposition. The temperature is maintained by balancing the heat of formation of the hydrates and perhydrates of sodium carbonate in the reaction mixture, the evaporation of water from the reaction mixture and the heat exchange between the raw materials and gas streams. With these factors in mind one skilled in the art can, without undue experimentation calculate the optimal conditions based on his specific economic and process constraints. Clearly, additional heat exchangers may be employed as convenient.

Any standard analytic method may be employed to analyze the soda ash carrier composition as follows:

Sodium Carbonate or Total Alkalinity (TA) may be determined by titrating with a standardized to a methyl orange endpoint and reported as % $NaCO_3$ (sodium carbonate).

Active Oxygen (AO) may be determined by titrating with a standardized permanganate or ceric sulfate solution or determined iodometrically by titrating liberated iodine with standardized thiosulfate solution and alternatively reported as % AO, % $H_2O_2$, (2.125×% AO) or % SCP (6.542×% AO). The detailed procedures are conveniently described in FMC Corporation's Technical Bulletin 59, "The Analysis of Hydrogen Peroxide Solutions".

Available Water (% H₂O) may be determined conveniently by thermogravimetric analyses or by weight lost on standing over a dessicant at room temperature.

Water (% AW) can be determined gravimetrically by igniting a sample to about 200° C. in a gas stream and measuring the increase in weight of a suitable absorbant, such as magnesium perchlorate, in the gas stream. Available water may be estimated as % AW=% $H_2O + 0.529 \times$ % $H_2O_2$.

The following examples are presented to illustrate to one skilled in the art the best mode of practicing the invention and are not intended to be limiting. The stabilizer is exemplified in terms of the preferred commercial compound, 1-hydroxyethylidene-1,1-diphosphonic acid.

Laboratory samples of the SAPC were prepared by adding a diphosphonic acid (if any) into 70% by weight hydrogen peroxide to form a mixed solution. Anhydrous sodium carbonate was introduced into a laboratory rotary evaporator equipped with a waterbath for temperature control unless otherwise stated. The desired quantity of mixed solution of hydrogen peroxide and diphosphonic acid was sprayed onto the soda ash to form a reaction mixture while mixing to ensure homogeneity and concomitantly water vapor was removed by applying by vacuum or by air introduced over the surface of the reaction mixture. After the desired quantity of mixed solution was sprayed the reaction mixture was removed as product.

The humidity chamber stability was determined by placing a sample in a crystallizing dish in a humidity chamber at 40° C. and 80% relative humidity. The percent hydrogen peroxide was determined by iodometric titration and recorded over ten days. No corrections were made for the amount of water absorbed or lost in the samples.

The stability was also confirmed by differential scanning calorimetry (DSC) and by thermal gravimetric analysis (TGA).

EXAMPLE 1

SAPC compositions with and without diphosphonic acid were prepared and their stability was determined in a humidity chamber (Table I). Soda ash mixtures with hydrogen peroxide alone were unstable at almost all composition levels, the higher the percent hydrogen peroxide the more unstable. When a diphosphonic acid was added along with the hydrogen peroxide, stable perhydrates were produced. Table I shows that stable compositions assaying from 55% to 75% SCP were made by this process. Compositions assaying more than 75% SCP (more than 25% $H_2O_2$) were unstable regardless of the presence of the diphosphonic acid.

EXAMPLE 2

The stability of a composition assaying 55% SCP (18% hydrogen peroxide) is summarized in Table II. Stability of an 18% hydrogen peroxide mixture toward storage at 50° C. and 40% relative humidity is shown in Table III. These data indicate that a product is produced that is stable towards storage at relatively high temperature and humidity. It is further seen that compositions made by this process are as stable as other peroxygens in commercial use—sodium perborate tetrahydrate and sodium perborate monohydrate and commercial SCP coated with silicates (Table IV).

EXAMPLE 3

Figure 2:
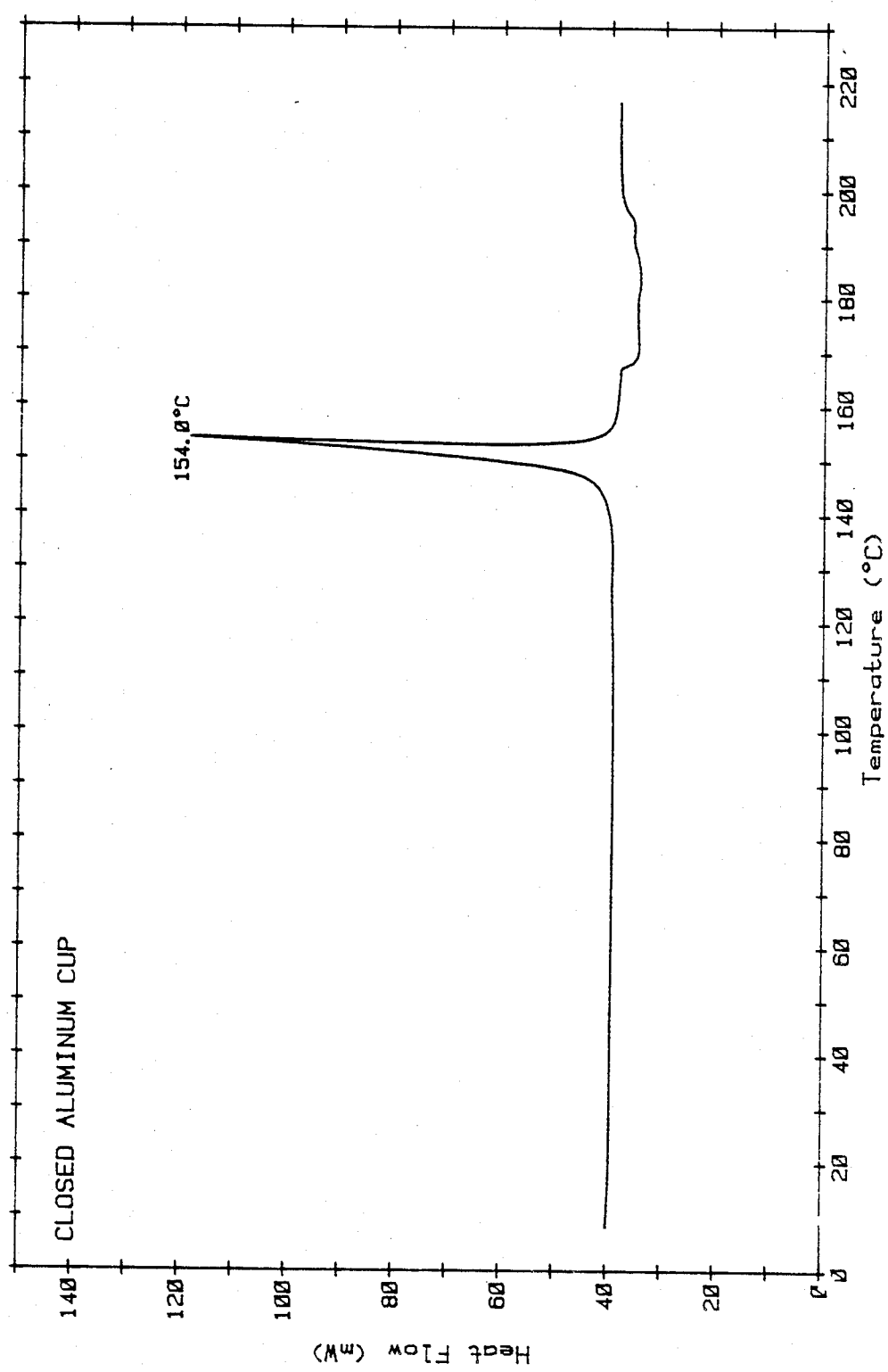
Figure 3:
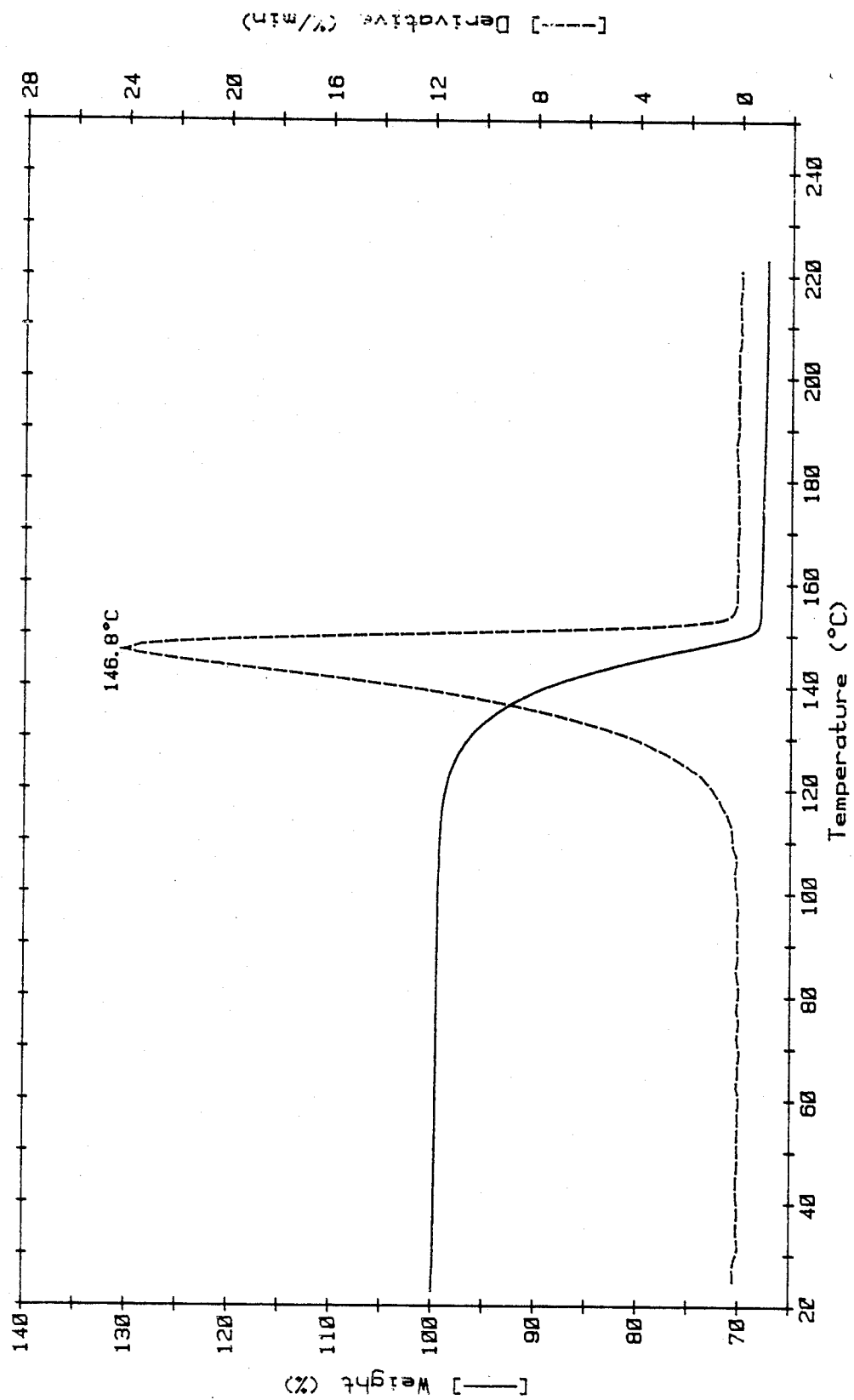

The thermal stability of compositions assaying 55% SCP (18% hydrogen peroxide) was determined by thermal gravimetric analysis (TGA) and differential thermal analysis (DTA). These analyses show that compositions are stable up to approximately 150° C. The TGA analyses also show that two types of water of crystallization initially may exist in these compositions which compositions superficially appear to be sodium carbonate decahydrate and sodium carbonate monohydrate (FIG. 1). The former is easy to remove or convert to the monohydrate (Table V). The monohydrate water is more difficult to remove. The presence of the monohydrate does not lead to severe caking as does the presence of the decahydrate. The diphosphonic acid appears to modify the monohydrate crystal allowing water of crystallization to be removed thereby forming an almost anhydrous product. This is shown in the TGA and DSC analyses in FIGS. 2 and 3. This product is less likely to cake on contact with moderately humid environment.

Table V and FIG. 1 also show the unexpected properties of SAPC when compared with the published data for the vapor pressure of water at 40.4° C. over sodium carbonate monohydrate of 2.12 kPa (15.9 mm) compared with the vapor pressure of water at 40.5° C. and 80% relative humidity of 6.06 kPa (45.4 mm). According to the published data the sodium carbonate monohydrate formed in the SAPC should, but does not, absorb water from the atmosphere. Further, the ability to remove water from SAPC is unexpected in view of U.S. Pat. No. 4,020,148 which teaches it is most difficult to dry SCP in commercial quantities so that it contains negligible amounts of moisture without reducing the active oxygen content.

EXAMPLE 4

Diphosphonic acid is required for solution stability and SAPC stability as well as for ease of removal of water of hydration. Samples were prepared in a laboratory Hobart blender containing 0.2%, 0.7% and 1.3% diphosphonic acid. Table VI summarizes the effect of the diphosphonic acid additive on the stability of the composition. The amount of additive required is much higher than that required to simply stabilize the hydrogen peroxide by chelating heavy metals. The SAPC compositions were found as stable as commercial SCP (coated), sodium perborate monohydrate and sodium perborate tetrahydrate. This is shown in Table IV.

EXAMPLE 5

In addition to determining the stability of the soda ash/hydrogen peroxide composition as a function of hydrogen peroxide and moisture, the hydrogen peroxide uptake was determined as a function of particle size distribution of the soda ash. It was shown by Table VII that for a given hydrogen peroxide content the hydrogen peroxide content of the smaller particles was greater than that of the larger particles. The presence of fine particles containing a disproportionately high concentration of hydrogen peroxide appears to result in instability of the product.

EXAMPLE 6

A ribbon blender with a water jacket was used as the reaction vessel having a 0.15 m³ (5 ft³) capacity for a pilot scale test. Aqueous hydrogen peroxide, usually containing a diphosphonic acid, was pumped from drums through spray nozzles on each end of the blender. In all cases 70% $H_2O_2$ solution was used.

Temperature was measured at three points in the reaction mixture using thermocouples, and was controlled by varying the peroxide feed rate. Cooling was provided either by water in the blender jacket or using air flow above or through the bed. Solids leaving the blender with the air stream were trapped in a Venturi scrubber and the resulting solution analyzed for material balance purposes.

The heat balance was carefully controlled using the same procedure for all the runs:

Start the blender.
Charge a pre-weighed amount of soda ash.
Start air or cooling water.
Feed $H_2O_2$ solution until the desired weight is added.
Allow the product to cool about one hour before discharging through the bottom valve.

Stability was determined by storing 0.14 m³ fiber drums of product in a hot room at 50° C./20% RH and measuring active oxygen loss after 19 days. The product was exposed in the drum, and a loose fitting lid with no clamp was kept on top.

A summary of results is presented as Table IX. In all cases, peroxide efficiency was 95+% after addition.

It is clear that a ratio of 1 or more moles of sodium carbonate per mole of available water is critical for a stable product.

TABLE I

SAPC STABILITY VS $H_2O_2$ CONCENTRATION
HUMIDITY TEST

| INITIAL % $H_2O_2$ ASSAY | SAPC (UNSTABILIZED) % $H_2O_2$ LOSS | SAPC (STABILIZED) % $H_2O_2$ LOSS |
| --- | --- | --- |
| 15 | 17.40 | 5.20 |
| 18 | 22.03 | 3.20 |
| 20 | 21.98 | 2.51 |
| 22 | 16.43 | 5.65 |
| 24 | 19.02 | 4.53 |
| 28 | 26.64 | 7.13 |

TABLE II

SODA ASH PEROXYGEN CARRIER
HUMIDITY TEST 40° C. 80% R.H.
INITIAL $H_2O_2$ CONCENTRATION 18%

| TIME (DAYS) | % HYDROGEN PEROXIDE REMAINING |
| --- | --- |
| 1 | 100.0 |
| 2 | 100.0 |
| 3 | 100.0 |
| 5 | 99.5 |
| 8 | 98.6 |
| 10 | 98.6 |

TABLE III

SODA ASH PEROXYGEN CARRIER
STORAGE STABILITY
50 Deg. C. 40% R.H.

| TIME (DAYS) | % HYDROGEN PEROXIDE REMAINING |
| --- | --- |
| 11 | 98.4 |
| 18 | 99.8 |
| 25 | 97.1 |
| 32 | 99.8 |

TABLE IV

COMPARATIVE STABILITY OF SAPC
WITH SODIUM PERBORATE
40 Deg. 80% R.H.

| COMPOSITION | % HYDROGEN PEROXIDE REMAINING |
| --- | --- |
| SAPC | 96.5 |
| SAPC (no diphosphonic acid) | 16.5 |
| Sodium Perborate Monohydrate | 97.6 |
| Sodium Perborate Tetrahydrate | 96.1 |
| Commercial Sodium Carbonate Peroxide (Coated) | 97.0 |

TABLE V

SAPC HYDRATE CONVERSION AT 40 Deg. C. 80 R.H.

| | % BY WEIGHT | | |
| --- | --- | --- | --- |
| TIME (DAYS) | DECA-HYDRATE | MONOHYDRATE | MONO/DEC RATIO |
| 0 | 4.46 | 3.39 | 0.76 |
| 1 | 2.58 | 5.56 | 2.16 |
| 2 | 1.23 | 6.12 | 4.98 |
| 3 | 0.55 | 6.71 | 12.20 |
| 6 | 0.24 | 6.83 | 16.71 |

TABLE VI

SAPC STABILITY VS. DIPHOSPHONIC
ACID CONCENTRATION
40 Deg. 80% R.H.
10 DAYS
18% HYDROGEN PEROXIDE

| % DIPHOSPHONIC ACID | % HYDROGEN PEROXIDE REMAINING |
| --- | --- |
| 0.2 | 81.2 |
| 0.7 | 92.5 |
| 1.3 | 95.9 |

TABLE VII

EFFECT OF PARTICLE SIZE ON HYDROGEN
PEROXIDE UP-TAKE

| SIEVE SIZE μm | WT. % SODA ASH | WT % HYDROGEN PEROXIDE IN SODA ASH FRACTION |
| --- | --- | --- |
| 425 | 8.99 | 15.29 |
| 212 | 58.69 | 17.61 |
| 150 | 19.80 | 20.33 |
| 75 | 11.90 | 24.02 |
| 53 | 0.52 | 26.03 |
| <53 | 0.10 | 25.92 |

TABLE VIII

HEAT OF MIXING 70% HYDROGEN PEROXIDE
AND SODA ASH

| % HYDROGEN PEROXIDE | HEAT OF MIXING (BTU/LB) |
| --- | --- |
| 16.57 | 753.4 |
| 18.59 | 835.6 |
| 20.47 | 907.9 |
| 22.18 | 935.0 |
| 23.81 | 906.2 |
| 25.38 | 929.9 |
| 30.56 | 932.0 |

TABLE IX

| | | | | SAPC PILOT TEST - RIBBON BLENDER | | | | | | | | |
|---|---|---|---|---|---|---|---|---|---|---|---|---|
| | Bulk | Bed | | Product H$_2$O$_2$ | | H$_2$O | | Total Atomic | Na$_2$CO$_3$ | | | Diphos- phonic | % H$_2$O$_2$ Lost |
| | Density | Temp. | Cool- | | | | | | | at % | | | |
| Run | g/ml | °C. | ing | wt % | % H | wt % | % H | % H | wt % | Na | Na/H | Acid % | 19 Days |
| 1 | 0.77 | 41 | Jacket | 18.22 | 1.07 | 8.08 | 0.90 | 1.97 | 73.38 | 1.38 | 0.70 | 0.32 | 100* |
| 2 | 0.95 | 39 | Jacket | 23.00 | 1.35 | 9.47 | 1.05 | 2.40 | 67.12 | 1.27 | 0.53 | 0.41 | 100* |
| 3 | 0.77 | 43 | Jacket and air over | 22.63 | 1.33 | 5.42 | 0.60 | 1.93 | 71.39 | 1.35 | 0.70 | 0.56 | 100* |
| 4 | 0.95 | 42 | air through | 20.77 | 1.22 | 1.81 | 0.20 | 1.42 | 76.87 | 1.45 | 1.02 | 0.55 | 10.2 |
| 5 | 1.06 | 45 | air through | 18.71 | 1.10 | 2.73 | 0.30 | 1.40 | 78.03 | 1.47 | 1.05 | 0.53 | 6.4 |
| 6 | 0.58 | 43 | air through | 17.67 | 1.04 | 5.54 | 0.62 | 1.66 | 76.26 | 1.45 | 0.87 | 0.53 | 20.3 |
| 7 | 0.77 | 49 | air through | 18.66 | 1.10 | 2.22 | 0.25 | 1.35 | 78.61 | 1.48 | 1.09 | 0.51 | no test |
| 8 | 0.77 | 55 | air through | 19.12 | 1.12 | 2.39 | 0.27 | 1.39 | 77.97 | 1.47 | 1.05 | 0.52 | 4.2 |
| 9 | 0.77 | 47 | air through | 31.01 | 1.82 | 1.88 | 0.21 | 2.03 | 66.41 | 1.25 | 0.62 | 0.70 | 100* |
| 10 | 0.77 | 45 | air over | 18.89 | 1.11 | 2.72 | 0.30 | 1.41 | 77.90 | 1.46 | 1.04 | 0.49 | 6.6 |
| 11 | 0.77 | 46 | air through | 17.26 | 1.02 | 7.50 | 0.83 | 1.85 | 75.24 | 1.41 | 0.76 | 0.0 | 100* |

*drum caked solidly

We claim:

1. A process for manufacturing a soda ash peroxygen carrier composition comprising incorporating into an aqueous solution of 50% to 80% by weight hydrogen peroxide a diphosphonic acid or salt having a formula of

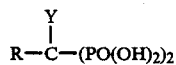

wherein Y is hydrogen or hydroxyl, R is hydrogen or an aliphatic group having one to six carbons, to form a mixed solution, uniformly applying the mixed solution to a solid particulate reaction mixture initially comprising substantially anhydrous particles of sodium carbonate, concomitantly urging water vapor from the surface of the reaction mixture, and maintaining the temperature of the reaction mixture between about 35° C. and 80° C., said diphosphonic acid or salt being present in an amount to provide 0.1% to 3% diphosphonic acid or salt in the composition thereby providing as product a soda ash peroxygen carrier assaying 45% to 75% as sodium carbonate perhydrate and containing between 1 to 5 moles of sodium carbonate for each mole of available water in the composition, said available water consisting essentially of water chemically available as hydrogen peroxide, water of crystallization and free water.

2. The process of claim 1 wherein Y is hydroxyl, and R is methyl.

* * * * *

UNITED STATES PATENT AND TRADEMARK OFFICE
CERTIFICATE OF CORRECTION

PATENT NO. : 4,966,762

DATED : October 30, 1990

INVENTOR(S) : Henry A. Pfeffer and William A. Hills

It is certified that error appears in the above-identified patent and that said Letters Patent is hereby corrected as shown below:

Column 5, line 1, "Available Water" should read --Water--.
Column 5, line 4, "Water" should read --Available Water--.
Column 10, line 35, "between 1 to 5 moles of sodium" should read --between 1 and 5 moles of sodium--.

Signed and Sealed this

Twenty-first Day of April, 1992

Attest:

HARRY F. MANBECK, JR.

Attesting Officer

Commissioner of Patents and Trademarks